United States Patent [19]

Lepley et al.

[11] 4,412,762

[45] Nov. 1, 1983

[54] PNEUMATIC UNLOADING OF PARTICULATES

[75] Inventors: Richard H. Lepley, Easton; Thomas A. Happel, Nazareth, both of Pa.

[73] Assignee: Pfizer Inc., New York, N.Y.

[21] Appl. No.: 277,301

[22] Filed: Jun. 25, 1981

[51] Int. Cl.³ .............................................. B65G 53/50
[52] U.S. Cl. ..................................... 406/134; 406/30; 406/196; 366/114
[58] Field of Search .................... 406/10, 30, 34, 134; 222/196, 55; 366/110, 111, 414, 166

[56] References Cited

U.S. PATENT DOCUMENTS

| | | | |
|---|---|---|---|
| 2,953,282 | 9/1960 | Peterson | 222/196 |
| 3,363,806 | 1/1968 | Blakeslee et al. | 366/114 X |
| 3,504,825 | 4/1970 | Diamond et al. | 222/61 X |
| 4,059,310 | 11/1977 | Waskiewicz et al. | 406/30 |

FOREIGN PATENT DOCUMENTS 902553  6/1972  Canada.

Primary Examiner—Andres Kashnikow
Assistant Examiner—L. E. Williams
Attorney, Agent, or Firm—Charles J. Knuth; Peter C. Richardson; Harold W. Ordway

[57] ABSTRACT

A substantially continuous flow is attained in the unloading of a bulk particulate from a storage hopper by monitoring the pressure differential between the hopper and a point in the discharge line downstream of the hopper outlet. The pressure differential is sensed by a pressure switch in the discharge line which activates a vibrator on the hopper near the outlet when the differential is at a first predetermined value and deactivates the vibrator when the differential is at a second predetermined value, thereby maintaining the flow and reducing mechanical damage to the hopper.

6 Claims, 4 Drawing Figures

PNEUMATIC UNLOADING OF PARTICULATES

BACKGROUND OF THE INVENTION

This invention relates to an apparatus for and method of pneumatically unloading dry particulates from storage hoppers.

The unloading of dry particulates, especially those such as precipitated calcium carbonate and titanium dioxide which exhibit poor flow characteristics, from such as bulk hopper railcars and trucks presents a constant problem to handlers of bulk solids. The particulate material is commonly discharged from such a hopper through one or more bottom outlets in the hopper and pneumatically conveyed through a discharge line either directly to a process area utilizing the material or to a temporary storage bin. As the material flows through the hopper outlet, an air cone or "rat-hole" tends to develop above the outlet and flow of the material eventually stops.

This effect is commonly overcome by the use of portable vibrators attached to the car or truck through special brackets mounted on or near the hopper outlet. With current practice, the vibrators are usually operated continuously throughout the unloading period, high impact vibration being required to promote flow of those materials with poor flow characteristics. This continuous, high impact vibration causes structural failure to the hopper and compounds the flow problem by further densifying the material.

Since hopper cars and trucks are normally constructed of lightweight materials with minimum structural support in order to maximize payload, it is not practical to increase the strength of the structure to withstand the increased vibration. Instead, a trapezoidal shaped plate is usually welded to the hopper near the outlet and the vibrator bracket then welded to this plate. Mechanical failure generally occurs where the plate is welded to the thinner metal of the hopper.

This problem is particularly troublesome in manufacturing plants such as paper mills where many bulk commodities are received and an operator may be engaged in the unloading of several materials at the same time. Unless he is very attentive, the operator may not notice when a hopper is empty, and the resulting high impact vibration of the empty hopper is especially damaging.

It is therefore the primary objective of the present invention to provide an apparatus and method for pneumatically unloading such particulate material from storage hoppers which assures a substantially continuous flow of the material from the hopper with a minimum of mechanical damage to the hopper.

SUMMARY OF THE INVENTION

We have found that during the pneumatic unloading of substantially dry particulates from a storage hopper through a transfer line, the pressure differential between the hopper and a point in the line downstream of the hopper can be used to control the flow of the material from the hopper. Therefore, the present invention entails an apparatus for pneumatically unloading substantially dry particulate material from a storage hopper through a discharge line which comprises impact vibration means for contacting the hopper adjacent the discharge outlet thereof; means for creating a pressure differential between the hopper and a point in the line downstream of the outlet; and means for activating the vibration means when the pressure differential is at a first set value and deactivating the vibration means when the pressure differential is at a second set value, whereby a substantially continuous flow of the material through the line is maintained.

Preferably the apparatus further comprises timer means which deactivates the vibration means following a predetermined period of continuous vibration. The pressure differential-creating means of the apparatus is preferably a vacuum source and the activating-deactivating means is preferably a pressure switch. The apparatus is particularly adaptable for use wherein the storage hopper is a railroad hopper car and the particulate material is precipitated calcium carbonate.

The invention further comprises a method of controlling the flow rate of substantially dry particulate material from a storage hopper through a discharge line connected to the outlet thereof, which comprises creating a pressure differential between the hopper and a point in the line downstream of the connection; vibrating the hopper when the pressure differential is less than a first predetermined value; and discontinuing vibration of the hopper when the pressure differential is greater than a second predetermined value.

BRIEF DESCRIPTION OF THE DRAWINGS

The above and other objects, features and advantages of the present invention will be apparent from the following detailed description of embodiments thereof in conjunction with the accompanying diagrams wherein like reference numerals indicate like structures throughout the several drawings.

DETAILED DESCRIPTION OF THE INVENTION

Figure 1:
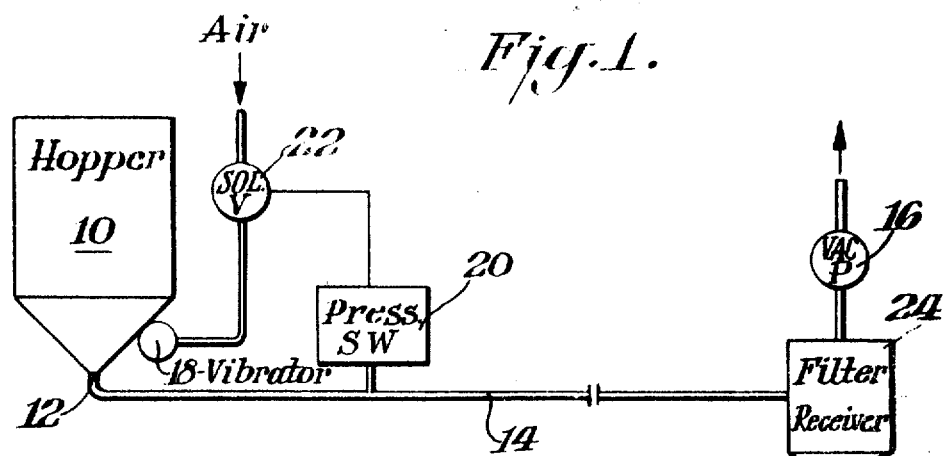
FIG. 1 is a schematic drawing of a pneumatic unloading system showing one embodiment of the apparatus in accordance with the invention.

FIG. 1 illustrates an embodiment of the apparatus and method of the present invention applied to the pneumatic unloading of substantially dry particulate material accomplished by use of a vacuum system.

The bulk material, such as precipitated calcium carbonate, stored in the storage hopper 10, which may be, for example, a bulk hopper railcar or truck, is unloaded from hopper 10 at outlet 12 through a discharge line 14 connected to a source of vacuum, such as vacuum pump 16, hopper 10 being at atmospheric pressure. To assist in the unloading, a portable vibrator 18 is attached to hopper 10 near outlet 12. While vibrator 18 as shown is driven by air pressure, it may also conveniently be driven hydraulically or electrically. The operation of vibrator 18 is controlled by a pressure switch 20 through a solenoid valve 22, pressure switch 20 in turn being connected to sense the pressure in discharge line 14 at a point slightly downstream of outlet 12. Although pressure switch 20 measures the pressure relative to atmospheric pressure, it is in effect measuring the pressure differential between hopper 10 and this point in discharge line 14 since hopper 10 is at atmospheric pressure. The particulate material discharging from hopper 10 is conveyed through discharge line 14 to filter/receiver 24 where it is emptied through a rotary valve 26 into a bin or silo 28.

This differential between the pressure in hopper 10 and that in discharge line 14 sensed by pressure switch 20 is a rough measure of the flow of the particulate material through discharge line 14, the absolute value of the pressure differential being dependent upon such factors as the capacity of vacuum pump 16, the size of discharge line 14 and the characteristics of the particular material being discharged. For example, the pressure differential may be about 3 to 5 inches (76 to 127 millimeters) mercury with no flow of the material, about 6 to 10 inches (152 to 254 millimeters) mercury with low moderate flow and about 11 to 13 inches (279 to 330 millimeters) mercury with good flow.

This variation in pressure differential can therefore be used to control the operation of vibrator 18. Since vibrator 18 is needed only when the flow of the particulate material through discharge line 14 diminishes, pressure switch 20 in conjunction with solenoid valve 22 can start vibrator 18 when this occurs and the pressure differential drops below a predetermined value. Likewise, vibrator 18 is stopped when adequate flow is restored and the pressure differential rises to a second predetermined value. For example, pressure switch 20 may have a set point of 9 inches (229 millimeters) mercury and a differential of 2 inches (51 millimeters) mercury. Thus, when the flow diminishes and the pressure differential drops below 9 inches mercury, solenoid valve 22 is opened allowing air to flow to vibrator 18 and vibration thus commences. As more material flows through discharge line 14 and the pressure differential increases to 11 inches mercury, solenoid valve 22 closes and vibration ceases. The cycle is repeated if the material flow diminishes and the pressure differential again drops below 9 inches mercury.

The apparatus may also include a variable timer which shuts off vibrator 18 when hopper 10 is empty. Since if no more than from about 5 to 10 minutes is required to establish the desired pressure differential and flow with material remaining in hopper 10, a longer period of continuous vibration indicates that hopper 10 is empty. The timer is thus set to shut off vibrator 18 and sound an alarm when a period slightly in excess of this required time has expired.

Figure 2:
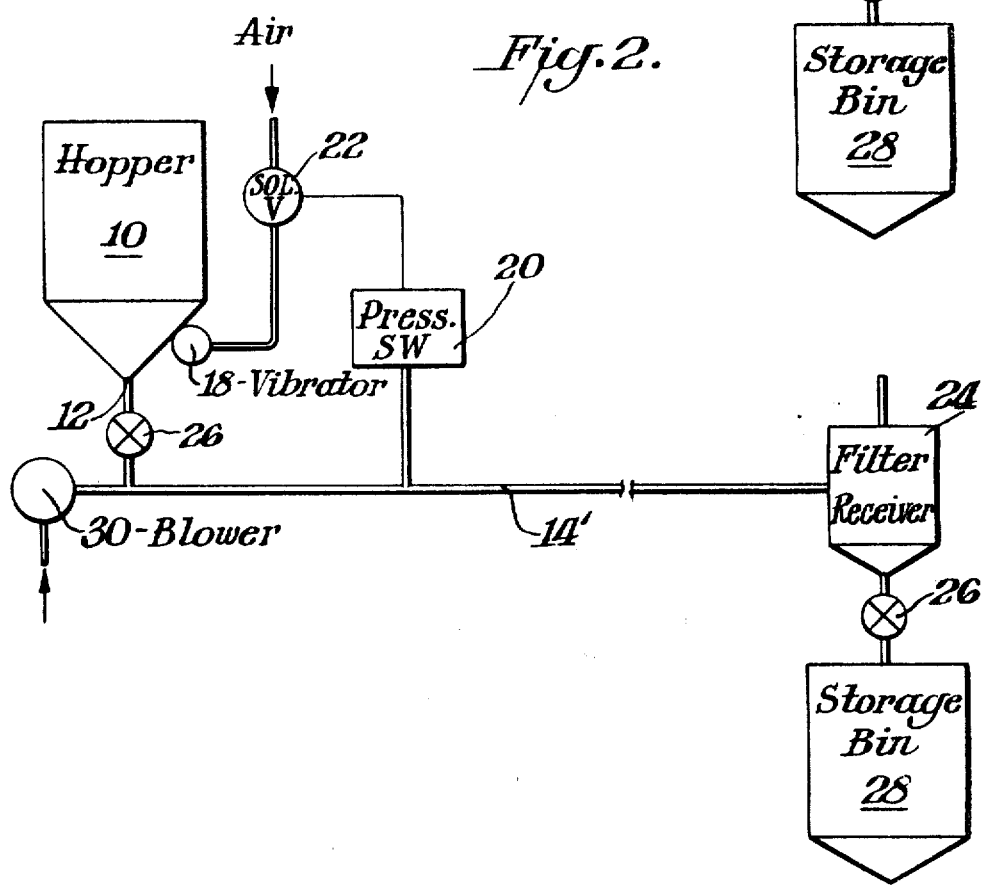
FIG. 2 is a schematic drawing of a pneumatic unloading system showing another embodiment of the apparatus.
Figure 3:
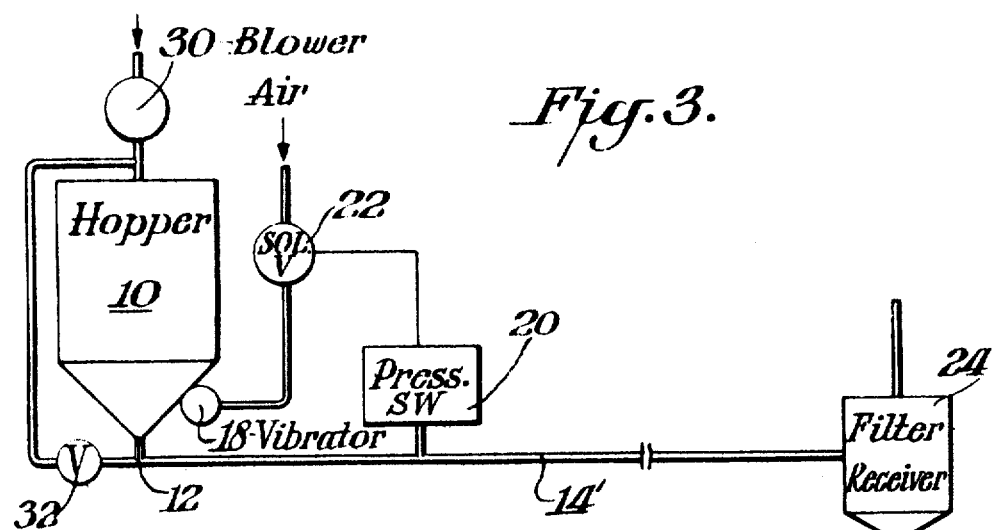
FIG. 3 is a schematic drawing of a pneumatic unloading system showing still another embodiment of the apparatus.

FIGS. 2 and 3 illustrate embodiments of the apparatus in which the pneumatic system is operated under positive pressure. The pressure differential between hopper 10 and discharge line 14' as sensed by pressure switch 20 in the system of FIG. 2 is supplied by a blower 30 in discharge line 14', hopper 10 being at atmospheric pressure. In the system of FIG. 3, compressed air is supplied by blower 30 to both hopper 10 and discharge line 14', the relative amounts being conrolled by manual control valve 32. In this latter system, although the pressure differential between hopper 10 and discharge line 14' is not the same as the pressure measured by pressure switch 20 since hopper 10 is not at atmospheric pressure, the measured pressure nonetheless reflects the pressure differential between hopper 10 and discharge line 14'. In both systems, as with the system of FIG. 1, the pressure differential diminishes as the flow of particulate material through discharge line 14' decreases.

Thus, as flow drops and the pressure differential falls below a given value, pressure switch 20 causes solenoid valve 22 to open and thereby actuate vibrator 18. As adequate flow resumes and the pressure differential rises above a second set value, pressure switch 20 closes solenoid valve 22 and thereby deactivates vibrator 18. With the system of FIG. 2, the pressure differential may be about 2 psig (103 millimeters mercury) with no flow and about 10 to 12 psig (517 to 620 millimeters mercury) with adequate flow. For the system of FIG. 3, the pressure differential may be essentially zero, with both hopper 10 and discharge line 14' at about 2 psig, with no flow and about 3 psig (155 millimeters mercury), with hopper 10 at about 15 psig (776 millimeters mercury) and discharge line 14' at about 12 psig, with adequate flow.

Figure 4:
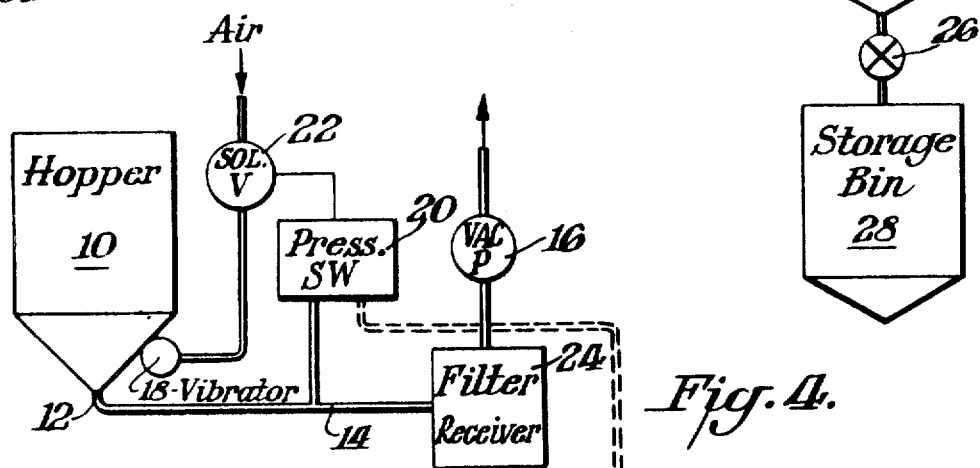
FIG. 4 is a schematic drawing of a pneumatic unloading system showing a further embodiment of the apparatus.

FIG. 4 illustrates the present apparatus with a pneumatic system employing both vacuum and pressure, commonly referred to as a push-pull system. In such a system, pressure switch 20 may be connected to either discharge line 14 which is under vacuum or to discharge line 14' which is under pressure. When pressure switch 20 is connected to discharge line 14, shown in FIG. 4 by a solid connection, operation will be as with the system in FIG. 1, while when it is connected to discharge line 14', shown by a dashed connection, operation will be as with the system in FIG. 2.

While the apparatus and method of the present invention may be used in general for any particulate material, the primary application is for particulates of average particle size of about 500 microns or less or those having poor dry flow characteristics, especially fine powders of relatively uniform particle size of about 10 microns or less. These include, for example, such diverse ground or precipitated minerals as alumina, calcium carbonate, cement, clay, iron oxides, talc and titanium dioxide, and such food products as powdered milk and flour.

The following examples are merely illustrative and are not to be construed as limiting the invention, the scope of which is defined by the appended claims.

EXAMPLE 1

An ACF Center Flow railcar fitted with gravity outlets and containing a shipment of precipitated calcium carbonate having an average particle size of about 0.5 micron was received at a paper mill for unloading by the system illustrated in FIG. 1.

Upon arrival, a pan was attached to the outlet of each of the car's four hoppers and a 5-inch diameter vacuum discharge line was connected to one of the pans. Two air vibrators (Brute ® CCV6, Martin Engineering Co., Neponset, Illinois) were installed in the brackets provided near the outlet. A pressure switch (Catalog 836-C1, Allen-Bradley Co., Milwaukee, Wisconsin) was installed in conjunction with a vacuum gauge in the discharge line about 20 feet downstream from the hopper outlet. Solenoid valves (ASCO Red-Hat ® 8210D2, Automatic Switch Co., Florham Park, New Jersey) electrically connected to the pressure switch were installed in the air lines used to operate the vibrators, the valves normally being closed with no voltage applied. The pressure switch was set to open the solenoid valves when the gauge reading was 8 inches (203 millimeters) mercury and to close the valves when the gauge reading was 11 inches (279 millimeters) mercury; previous experience had shown little material flow through the line with a gauge reading of 8 inches mercury or less and an adequate flow with a reading of 11 inches mercury or more. A timer equipped with an alarm was also installed such as to close the solenoid valves when the vibrators ran continuously for 20 minutes to indicate when the car was empty.

The car was successfully unloaded, one hopper at a time, with substantially continuous flow of the product from each hopper throughout the unloading, the vibrators operating only about 60 percent of the unloading period.

A second railcar containing a load of spray dried precipitated calcium carbonate having an average particle size of about 1.0 micron was also unloaded using the same system. With this product, the pressure switch was set to open the solenoid valves and thereby activate the vibrators when the gauge reading was 5 inches (127 millimeters) mercury and to close the valves and thereby deactivate the vibrators when the gauge reading was 8 inches mercury; experience had shown that low flow existed at a gauge reading of 5 inches mercury or less, adequate flow existed at a gauge reading of 8 inches mercury and line plugging occurred with a gauge reading of 11 inches mercury or more. The car was successfully unloaded with little tendency for the material to plug or cease flow, the vibrators being operated only about 35 percent of the total unloading time.

EXAMPLE 2

An ACF Center Flow railcar containing precipitated calcium carbonate with an average particle size of about 0.5 micron was received at a second paper mill employing the vacuum-pressure unloading system illustrated in FIG. 4.

A pan accepting product from only one side of the car was attached to each of the four hoppers and a vacuum line was connected to one of the pans. Two Martin air vibrators were installed in the brackets on the hopper. A pressure switch in connection with a pressure gauge was installed downstream from the air blower in the pressure line, and solenoid valves connected as in Example 1.

The pressure switch was set to open the solenoid valves and thereby start the vibrators when the pressure gauge read 2 psig (103 millimeters mercury), and to close the solenoid valves and thereby stop the vibrators when the gauge read 5 psig (259 millimeters mercury), experience indicating little flow at 2 psig and adequate flow at 5 psig.

A timer was set to stop the vibrator and sound an alarm when the railcar was either half or completely empty.

The unloading of the carbonate proceeded without event, the vibrators being employed only about 60 percent during the unloading period to maintain a substantially continuous product flow in the discharge line.

A second railcar containing a kaolin clay having an average particle size of about 2 microns was unloaded successfully in the same manner, the vibrators operating only about 30 percent of the unloading period.

We claim:

1. Apparatus for pneumatically unloading substantially dry particulate material from a storage hopper through a discharge line, which comprises:
    impact vibration means for contacting said hopper adjacent the discharge outlet thereof;
    means for creating a pressure differential between said hopper and a point in said line downstream of said outlet; and
    means for activating said vibration means when said pressure differential is at a first set value and deactivating said vibration means when said pressure differential is at a second set value, whereby a substantially continuous flow of said material thru said line is maintained.

2. The apparatus of claim 1 which further comprises timer means which deactivates said vibration means following a predetermined period of continuous vibration.

3. The apparatus of claim 1 wherein said pressure differential-creating means is a vacuum source and said activating-deactivating means is a pressure switch.

4. The apparatus of claim 1 adapted for use wherein said storage hopper is a railroad hopper car.

5. The apparatus of claim 1 adapted for use wherein said particulate material is precipitated calcium carbonate.

6. A method of controlling the flow rate of substantially dry particulate material from a storage hopper through a discharge line connected to the outlet thereof, which comprises creating a pressure differential between said hopper and a point in said line downstream of said connection; vibrating said hopper when said pressure differential is less than a first predetermined value; and discontinuing vibration of said hopper when said pressure differential is greater than a second predetermined value.

* * * * *